United States Patent
Barker

(10) Patent No.: US 6,578,035 B1
(45) Date of Patent: Jun. 10, 2003

(54) METHOD FOR DYNAMIC VALIDATION OF A DISTRIBUTED DATABASE SEGMENT WHICH YIELDS A SUITABLE SUCCESSOR

(75) Inventor: Kent D. Barker, South Jordan, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/483,131

(22) Filed: Jan. 14, 2000

(51) Int. Cl.7 .............................................. G06F 17/30
(52) U.S. Cl. .......................... 707/10; 707/201; 707/203
(58) Field of Search ................................ 707/201, 202, 707/10, 9, 103 R, 203; 709/201, 223, 224; 713/201

(56) References Cited

U.S. PATENT DOCUMENTS

| | | | |
|---|---|---|---|
| 5,689,700 A | 11/1997 | Miller et al. | 707/10 |
| 5,878,415 A | 3/1999 | Olds | 707/9 |
| 5,893,107 A | 4/1999 | Chan et al. | 707/103 R |
| 5,893,118 A | 4/1999 | Sonderegger | 707/203 |
| 5,905,860 A | 5/1999 | Olsen et al. | 713/201 |

*Primary Examiner*—Jean M. Corrielus
*Assistant Examiner*—Gwen Liang
(74) *Attorney, Agent, or Firm*—Haynes and Boone, LLP

(57) ABSTRACT

A method and system for ensuring an current and valid copy of a distributed database is re-installed for a file server that has failed and been restored or otherwise has been offline and is then brought online. This invention can include validating the database each time the database is opened. The method can include placing a signature in the database indicating that the database was closed normally. The method can also include indicating the time the database was last used. The method can also check the partition placement and structure with other servers that hold replicas to insure that the partition structure is correct. The method can also include comparing the synchronization state of replicas with the other servers that hold replicas of the database to see if they agree on the synchronized/time/state of the replicas of the restored server. The method can also check to see that the database belongs to this server. The method can then notify the operator/administrator if the database is determined to be old or foreign. The operator/administrator can then produce a more suitable database if possible.

14 Claims, 3 Drawing Sheets

METHOD FOR DYNAMIC VALIDATION OF A DISTRIBUTED DATABASE SEGMENT WHICH YIELDS A SUITABLE SUCCESSOR

FIELD OF THE INVENTION

This invention relates generally to computer software, and more specifically to a system and method for maintaining a directory system in a distributed computer network.

BACKGROUND OF THE INVENTION

Personal computers or workstations may be linked in a computer network to facilitate the sharing of data, applications, files, and other resources. One common type of computer network is a client/server network, where some computers act as servers and others as clients. In a client/server network, the sharing of resources is accomplished through the use of one or more servers. Each server includes a processing unit that is dedicated to managing centralized resources and to sharing these resources with other servers and/or various personal computers and workstations, which are known as the clients of the server.

Directories and directory services are often provided to enable an environment for access to a particular resource. One example of a directory service is Novell Directory Services ("NDS") for Novell Netware networks, as provided by Novell, Inc. of Provo, Utah. NDS provides a logical tree-structure view of all resources on the network so that clients can access them without knowing where they are physically located.

For database applications where computers are widely distributed (e.g., geographically), replication provides an efficient way for distributed systems to access current information. Replication enables many computers or computer applications to work with their own local, current copy, or replica, of one or more entries. Since a widely distributed network may rely on many network links for connecting several servers and clients, a replica can provide an efficient method for storing specific copies of the entries.

However, replicas can often be very difficult to keep current; the level of difficulty being directly proportional with the expanse of the network distribution. A particularly difficult aspect of maintaining replicas of directories, is restoring the most updated copy after a file server fails and is then restored. On the Netware platform, Novell can keep an end user from copying old DS database data onto a server, even though the volume may fail and is restored to the server. Therefore the database is either up to date or the server is re-installed into the tree.

On platforms other than Novell, no mechanism is in place that has the ability to dictate and enforce a policy that will ensure that only a correct copy of the DS database is installed. For example, when a full restore of a Windows NT™ volume is performed, it may contain an outdated copy of the DS database. If this database is put into operation, it can cause misconverged replicas, or more serious problems if the partition structure has been changed since the backup was made.

It is desired to provide a unified mechanism for ensuring that only a correct, up to date version of the DS database is restored, or to properly manage out of date data.

SUMMARY OF THE INVENTION

In contrast to the prior art, the present invention provides a method and system for ensuring an up to date copy of the DS database is re-installed for a file server that has failed and been restored or otherwise is being brought online after being offline. This invention solves this problem by validating the DS database each time the database is opened. The method can include placing a signature in the database indicating that the database was closed normally. The method can also include indicating the time the database was last used. The method can also check the partition placement and structure with other servers that hold replicas to insure that the partition structure is correct. The method can also include comparing the synchronization state of replicas with the other servers that hold replicas of the DS database to see if they agree on the synchronized/time/state of the replicas of the restored server. The method can also check to see that the DS database belongs to this server. The method can then notify the operator/administrator if the database is determined to be old or foreign. The operator/administrator can then produce a more suitable database if possible.

One of the benefits of the invention is that the operator will not mistakenly corrupt the other associated databases in the network.

In addition, the method can include preparing the out of date database for current use once it has been determined that a better copy is not available.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

The present invention is described with several examples given below. It is understood, however, that the examples below are not necessarily limitations to the present invention, but are used to describe typical embodiments of operation.

The present invention relates to a method and system for controlling restoration of a hierarchical database that is stored on, or accessible through, a computer network or other computer system. The hierarchical database includes, without limitation: directory service database components, other hierarchical database components, and Novell Directory Service components such as containers, leaves, objects, attributes, and other associated files.

Computer networks which may be configured according to the invention include local networks, wide area networks, and/or the Internet. "Internet" as used herein includes variations such as a private Internet, a secure Internet, a value-added network, a virtual private network, or an intranet. The computers connected by the network may be workstations, laptop computers, disconnectable mobile computers, file servers, or a combination thereof. The network may include one or more LANs, wide-area networks, Internet servers and clients, intranet servers and clients, or a combination thereof.

Figure 1:
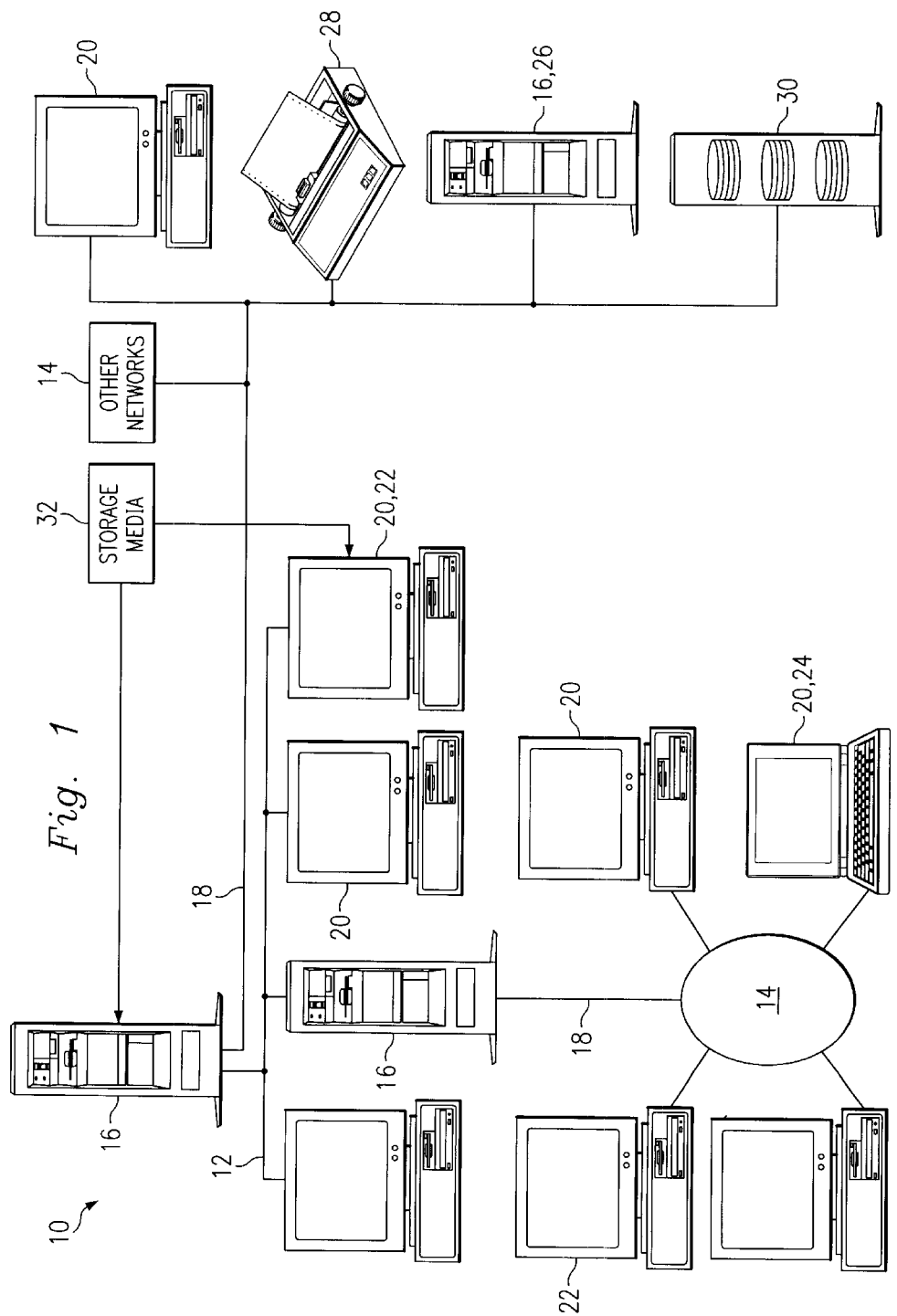
FIG. 1 is a diagram illustrating a computer networked hierarchical database system which is one of many systems suitable for use with the present invention.

One of the many computer networked hierarchical database systems suited for use with the present invention is indicated generally at 10 in FIG. 1. In one embodiment, the system 10 includes Novell NetWare network operating system software (NETWARE is a registered trademark of Novell, Inc.). In alternative embodiments, the system 10 includes VINES, Windows NT, Windows 95, LAN Manager, or LANtastic network operating system software and/or an implementation of a distributed hierarchical partitioned object database according to the X.500 protocol (VINES is a trademark of Banyan Systems; NT, WINDOWS 95, and LAN MANAGER are trademarks of Microsoft Corporation; LANTASTIC is a trademark of Artisoft). The system 10 may include a local area network 12 which is connectable to other networks 14, including other LANs or portions of the Internet or an intranet, through a gateway or similar mechanism.

The system 10 includes several file servers 16 that are connected by network signal lines 18 to one or more network clients 20. The file servers 16 and network clients 20 may be configured by those of skill in the art in a wide variety of ways to operate according to the present invention. The file servers 16 may be configured as Internet servers, as intranet servers, as directory service providers or name servers, as software component servers, or as a combination thereof. The servers 16 may be uniprocessor or multiprocessor machines. The servers 16 and clients 20 each include an addressable storage medium such as random access memory and/or a non-volatile storage medium such as a magnetic or optical disk.

Suitable network clients 20 include, without limitation, personal computers 22, laptops 24, workstations 26, and dumb terminals. The signal lines 18 may include twisted pair, coaxial, or optical fiber cables, telephone lines, satellites, microwave relays, modulated AC power lines, and other data transmission "wires" known to those of skill in the art. In addition to the network client computers 20, a printer 28 and an array of disks 30 are also attached to the system 10. A given computer may function both as a client 20 and as a server 16; this may occur, for instance, on computers running Microsoft Windows NT software. Although particular individual and network computer systems and components are shown, those of skill in the art will appreciate that the present invention also works with a variety of other networks and computers.

The file servers 16 and the network clients 20 are capable of using floppy drives, tape drives, optical drives or other means to read a storage medium 32. A suitable storage medium 32 includes a magnetic, optical, or other computer-readable storage device having a specific physical substrate configuration. Suitable storage devices include floppy disks, hard disks, tape, CD-ROMs, PROMs, RAM, and other computer system storage devices. The substrate configuration represents data and instructions which cause the computer system to operate in a specific and predefined manner as described herein. Thus, the medium 32 tangibly embodies a program, functions, and/or instructions that are executable by the file servers 16 and/or network client computers 20 to perform information object access control steps of the present invention substantially as described herein.

Figure 2:
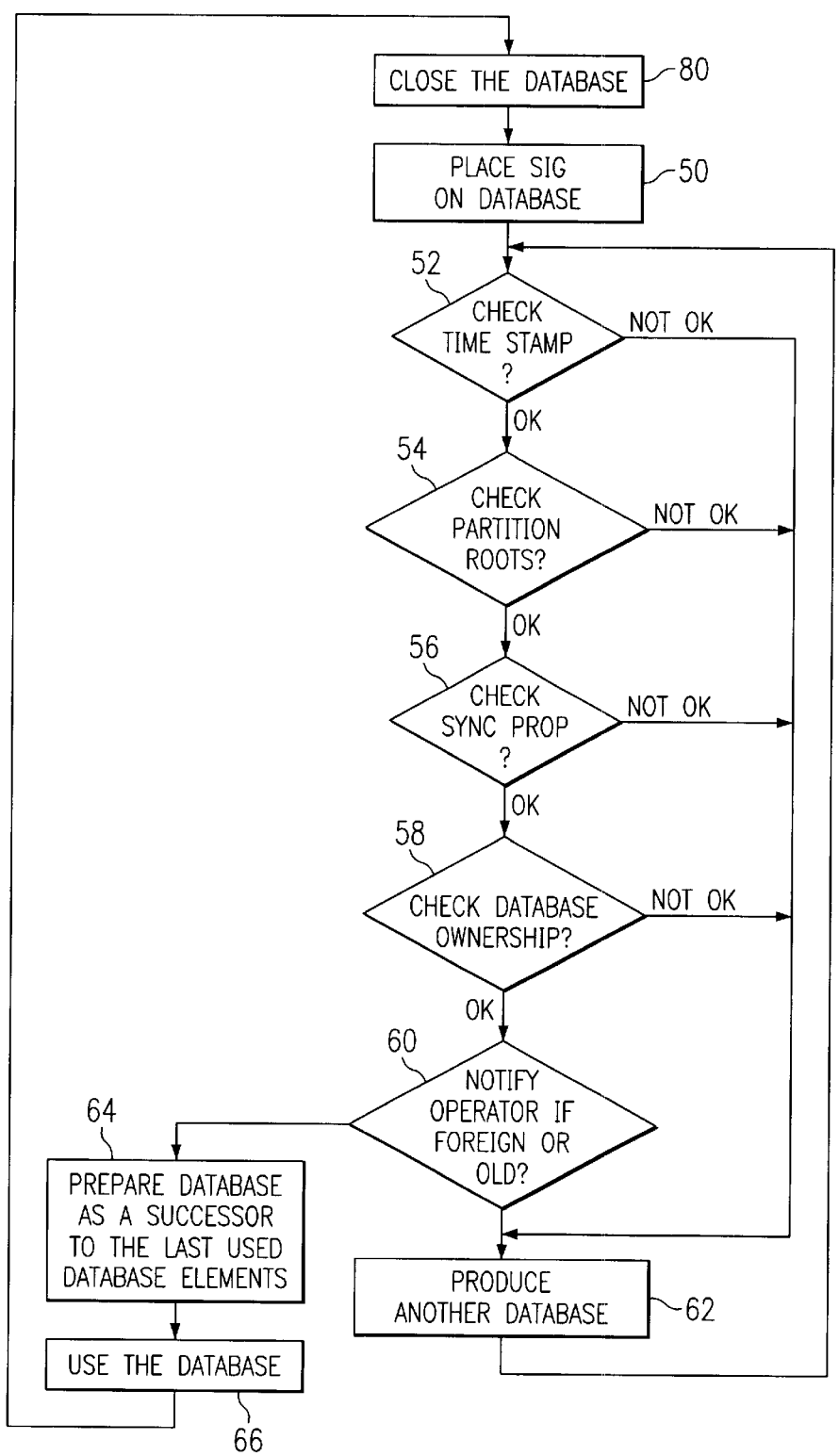
FIG. 2 is a flowchart illustrating a method for controlling restoration of a hierarchical database according to the present invention.

FIG. 2 illustrates a general method of the present invention for controlling successors to a distributed database segment. Detailed examples based on the general method are discussed in connection with FIGS. 3 through 5.

Referring back to FIG. 2, the present invention validates the database each time the database is opened. This is done using a variety of controls. Our first option is to place a signature in the database indicating that the database was closed normally as represented by block 50. A time stamp is also used to indicate when the database was last used as represented by block 52. In block 54, the partition roots are also checked against other servers that hold replicas of the database to insure that the partition structure is correct. In block 56, the synchronization properties for this server are also compared with the other servers that hold replicas to see that this server's properties agree with the properties of the replicas on the other servers. In block 58, the database is also checked to ensure that it belongs to this server. This may involve reconciling the server's name, network address, or encryption keys known to this server. The Operator is also notified in block 60 if the database is determined to be old or foreign. The operator then produces a more suitable database in block 62 if possible and then repeats the process again starting from block 52. However, if a more suitable database is not possible, a database is prepared as a successor to the last used database elements in block 64. The process then uses the database in block 66 and returns to block 80. In addition, the process determines that blocks 52, 54, 56, and 58 are not correct, the process jumps to block 60.

Methods are also provided to put the database into use if the operator indicates that this is the best copy available. In a simple case, this would include replacing objects in the replicas with up-to-date copies by manipulation of the synchronization vectors and/or replacing replicas on the server. If the server holds the only copy of a replica, then the replica can be declared active but with a warning to the operator that the data put into operation is missing any updates since the last used date, which may also be reported. If partition boundaries have been changed, then the affected objects within the database are converted to external reference pointers which reference the valid object data of a database on another server within the system, the affected replicas are removed from the server, and the operator is informed that the replicas will need to be replaced to return the server to it's previous state for replica distribution. However, certain conditions exist where the database is unsuitable for recovery and the operator is told that the server must be reinstalled.

Figure 3:
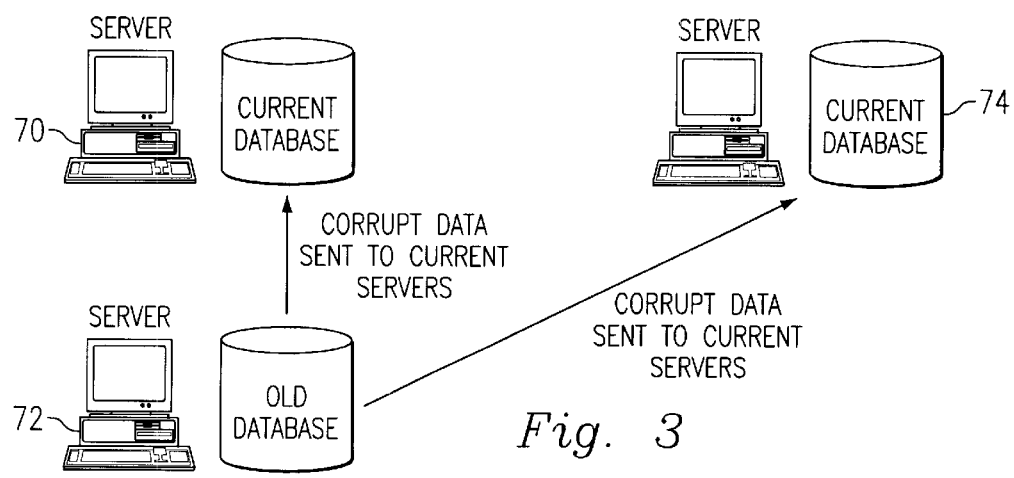
FIG. 3 is a diagram further illustrating that old data can cause corruption or improper convergence of other database elements.

FIG. 3 is a diagram illustrating an old database on a server 72 causing corruption or improper convergence of other database on operation servers 70 and 74.

Figure 4:
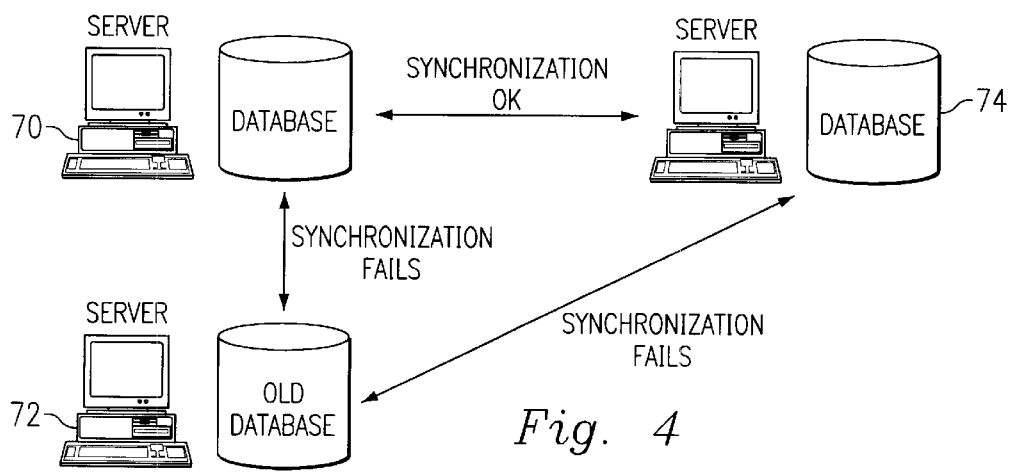
FIG. 4 is a diagram further illustrating database elements that fail to synchronize once old data is introduced into the system.

FIG. 4 is a diagram illustrating how database on operation servers 70 and 74 fail to synchronize properly once old data is introduced into the system by the old database on server 72.

Figure 5:
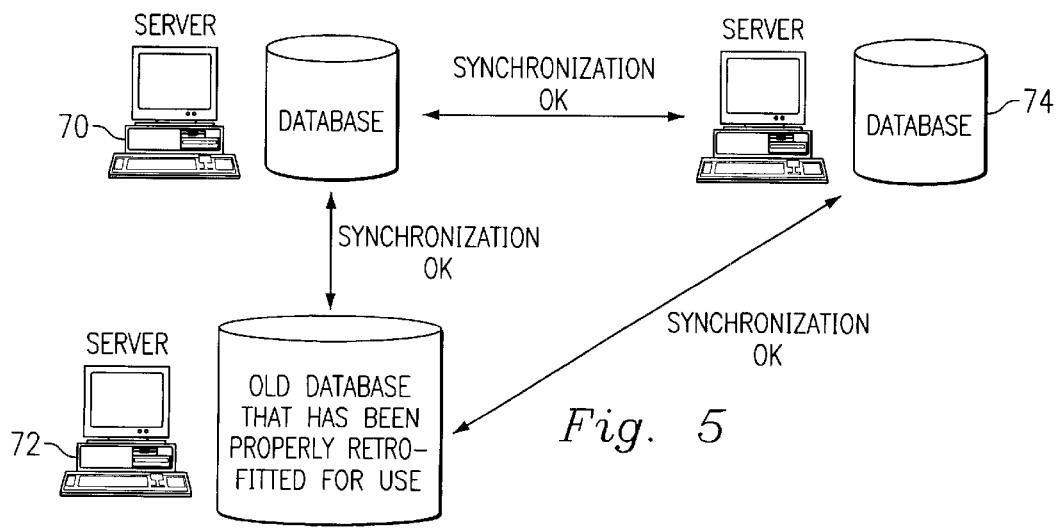
FIG. 5 is a diagram illustrating an old database element that was properly retrofitted for use and introduced into the system.

FIG. 5 is a diagram illustrating an example of an old database on server 72 that was properly retrofitted for use and introduced into the system. The old database on server 72 synchronizes with both operation servers 70 and 74 in this case.

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method for dynamic validation of a distributed database segment on a database on a server in a system, the method comprising:

creating a signature for the database indicating whether the last usage of the database had been completed successfully and the database was closed and tagged appropriately;

comparing a time signature on the database of a last time the database was used in relation to a time signature known by other databases in the system;

comparing a partition configuration of the database with the configuration from other servers' databases to determine that the correct replica distribution has been maintained;

checking a plurality of synchronization properties of the database with other databases in the system to validate that the instance of the database is time specific;

comparing an ownership property of the database with information known to belong to the server which may be retrieved from other databases;

determining whether the database is a correct copy to be introduced into the system; and notifying an operator whether the database is correct or not.

2. The method of claim 1 further including allowing the operator an option of providing the correct database for the server when it has been determined that the current database is not correct.

3. The method of claim 1 further including determining whether better copies of the database exist and if not, re-using an old database.

4. The method of claim 3 further including synchronizing objects to ensure other databases are aware of the reuse of the old database and re-activate the old database.

5. The method of claim 1 wherein the automatic identification of the current database's status is made.

6. The method of claim 5 further including operator status reporting, or an automated method by which another suitable database is produced or the decision to re-use the current database is made.

7. The method of claim 5 further including an automated determination by which another suitable database is produced.

8. The method of claim 5 further including re-using the current database if it determined that a better copy does not exist.

9. The method of claim 1 further including refurbishment of an old database to provide a suitable successor.

10. A computer program for dynamic validation of a distributed database with a database segment, the computer program comprising:

instructions for creating a signature for the database segment indicating whether the database segment was previously closed correctly;

instructions for comparing a time signature on the database of a last time the database in use;

instructions for comparing a partition configuration of the database;

instructions for checking a plurality of synchronization properties of the database;

instructions for comparing an ownership property of the database to a server that the database resides on;

instructions for determining whether the database is a correct copy to re-install; and instructions for notifying an operator whether the database is acceptable.

11. The computer program of claim 10 further including instructions for an automated response if an operator is not available to perform the task.

12. The computer program of claim 10 wherein the computer program resides on a general purpose microprocessor based computer.

13. The computer program of claim 10 wherein the computer program resides on a general purpose multi-process based computer.

14. A method for continued operation when a database has been replaced inadvertently, the method comprising:

copying information from a synchronization engine to replace out of date data;

replacing a plurality of objects that have been moved and where status can not be verified by the pointers to the objects;

modifying a plurality of internal data structures for use wherein the plurality of internal data structures includes at least one from a group consisting of: naming properties, network addresses, and encryption keys; and re-using an old database, when a correct database cannot be produced, by generating a suitable successor from data available in the old databases.

* * * * *